United States Patent [19]

Kasamatsu

[11] Patent Number: 4,760,751
[45] Date of Patent: Aug. 2, 1988

[54] ROTARY DRIVING MECHANISM
[75] Inventor: Taisuke Kasamatsu, Maebashi, Japan
[73] Assignee: Victor Company of Japan, Ltd., Japan
[21] Appl. No.: 883,520
[22] Filed: Jul. 8, 1986
[30] Foreign Application Priority Data

Jul. 12, 1985 [JP] Japan ............................ 60-106526[U]

[51] Int. Cl.⁴ .............................................. F16H 3/34
[52] U.S. Cl. ........................................ 74/354; 74/810; 242/201
[58] Field of Search ................ 74/353, 354, 380, 384, 74/406, 810, 63, 665 G, 665 GA, 665 F, 665 P, 665 Q; 242/201, 205; 360/96.1, 96.2, 96.3, 96.4

[56] References Cited

U.S. PATENT DOCUMENTS

| 2,948,485 | 8/1960 | Cotte | 242/201 |
|---|---|---|---|
| 3,028,767 | 4/1962 | Moore | 242/201 UX |
| 3,040,599 | 6/1962 | Carlson | 74/354 X |
| 3,144,787 | 8/1964 | Griessl | 74/354 X |
| 3,168,840 | 2/1965 | Williams | 74/810 X |
| 3,550,984 | 12/1970 | Moore | 242/201 X |
| 4,046,334 | 9/1977 | Kato et al. | 242/201 |
| 4,209,812 | 6/1980 | Umezawa et al. | 360/96.3 |
| 4,301,483 | 11/1981 | Santoro | 360/96.3 |
| 4,599,662 | 7/1986 | Iwasaki | 360/96.3 X |
| 4,612,590 | 9/1986 | Kurosawa | 360/96.2 X |

FOREIGN PATENT DOCUMENTS

| 2453339 | 5/1976 | Fed. Rep. of Germany | 242/201 |
|---|---|---|---|
| 2,842,299 | 4/1979 | Fed. Rep. of Germany | 242/201 |
| 2,901,087 | 7/1979 | Fed. Rep. of Germany | 74/810 |
| 5738358 | 8/1980 | Japan . | |
| 5817657 | 7/1981 | Japan . | |
| 121169 | 7/1983 | Japan | 242/201 |
| 36356 | 2/1984 | Japan | 242/201 |
| 2029627 | 3/1980 | United Kingdom | 360/96.3 |

*Primary Examiner*—Leslie A. Braun
*Assistant Examiner*—Dwight G. Diehl
*Attorney, Agent, or Firm*—Andrus, Sceales, Starke, Sawall

[57] ABSTRACT

A rotary drive mechanism selectively and rotationally drives at least first and second bodies which are to be driven. The rotary drive mechanism comprises a single motor, an arm structure pivotally supported on an output shaft rotated by the motor, a first rotation transmitting body fixed to the output shaft, a second rotation transmitting body rotatably supported on the arm structure and comprising a first part which is constantly linked to the first rotation transmitting body and a second part, and a third rotation transmitting body having a predetermined rotary load and linked to the second part when the arm structure is in a first rotary position. When the motor rotates in a forward direction, the second part disengages from the third rotation transmitting body and the first part engages and rotationally drives the first body when the arm structure rotates from the first rotary position to a second rotary position. When the motor rotates in a reverse direction, the second part disengages from the third rotation transmitting body and the first part engages and rotationally drives the second body when the arm structure rotates from the first rotary position to a third rotary position.

10 Claims, 5 Drawing Sheets

FIG. 6
FIG. 5
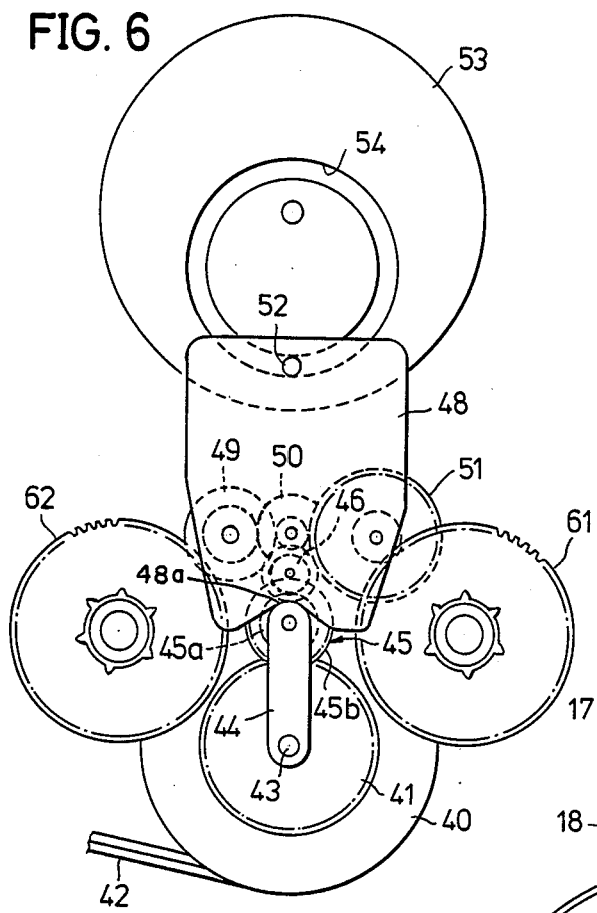
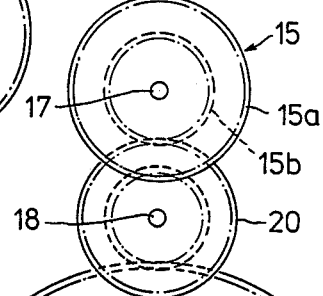
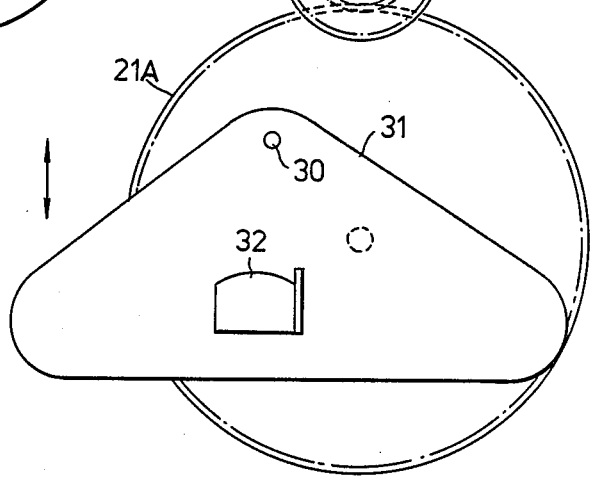

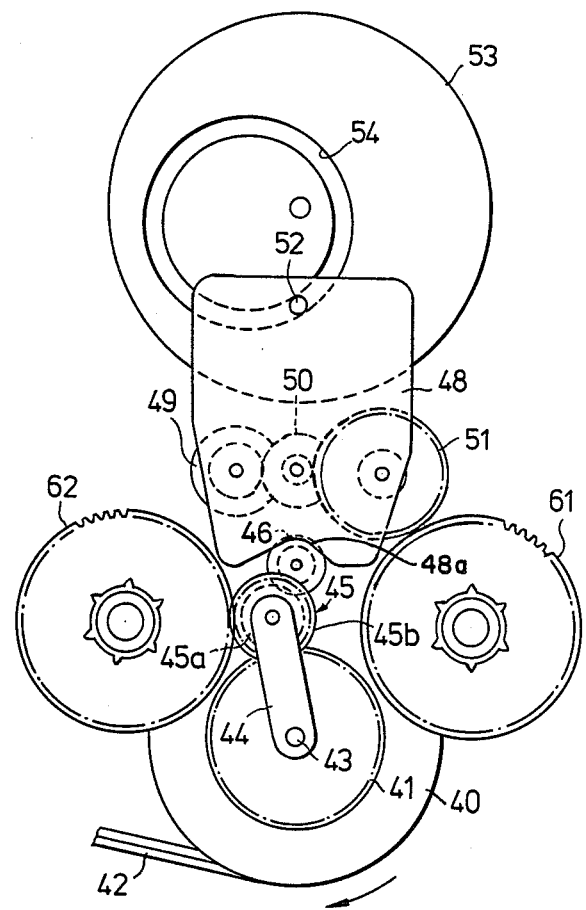

ROTARY DRIVING MECHANISM

BACKGROUND OF THE INVENTION

The present invention generally relates to rotary driving mechanisms, and more particularly to a rotary driving mechanism which can selectively and rotationally drive a plurality of bodies.

Conventionally, in fast-forward and rewind modes of an apparatus such as a tape recorder, a supply reel disc and a take-up reel disc are driven by motors provided exclusively for the two reel discs or by use of pulleys, belts and a single motor. However, some of the recent tape recorders and the like employ a driving mechanism which is controlled electronically. In this case, the electronically controlled driving mechanism is switched to a desired operating state by changing the operating state of the motor or solenoid by manipulating a switch.

However, when the two motors are provided exclusively for the two reel discs, there is a problem in that it is difficult to reduce the size, weight and manufacturing cost of the apparatus. In the case of the apparatus which uses the solenoid, the coupling between the solenoid and the driving mechanism becomes complex.

On the other hand, there is another conventional driving mechanism comprising a drive gear driven by a motor, a swing lever, and an intermediate gear which is rotatably supported on the swing lever and is constantly in mesh with the drive gear. According to this driving mechanism, a pair of reel discs are selectively driven by the intermediate gear depending on the rotary position of the swing lever. This driving mechanism has a simple construction but can selectively drive two reel discs. However, this driving mechanism cannot drive another mechanism in addition to the two reel discs, and there is a problem in that an independent driving mechanism must be provided exclusively for driving the other mechanism.

Still another driving mechanism has been proposed in a Japanese Utility Model Application No. 60-54640 in which the applicant is the same as the assignee of the present application. This proposed driving mechanism is designed so that the swing lever described above is pivotally supported on an output shaft of the motor with a predetermined friction. According to this proposed driving mechanism, it is possible to effectively reduce the slippage between the intermediate gear and the reel disc when the reel disc is driven. However, it is difficult to maintain stable performance of this driving mechanism for a long period of time. Furthermore, the driving mechanism cannot drive another mechanism in addition to the two reel discs.

SUMMARY OF THE INVENTION

Accordingly, it is a general object of the present invention to provide a novel and useful rotary driving mechanism comprising a motor rotatable in forward and reverse directions, an arm structure pivotally provided on an output shaft rotated by the motor and having first through third positions, a first rotation transmitting body provided on the output shaft rotated by the motor, a second rotation transmitting body having a first transmitting part rotatably supported on the arm structure and constantly linked to the first rotation transmitting body and a second transmitting part, and a third rotation transmitting body having a predetermined rotary load and linked to the second transmitting part in the first position of the arm structure. The second rotation transmitting mechanism drives a first body in the second position of the arm structure, and drives a second body in the third position of the arm structure. In addition, the second rotation transmitting body can drive a third body via the third rotation transmitting body in the first position of the arm structure. According to the rotary driving mechanism of the present invention, the rotary driving mechanism has a simple construction but it is possible to positively drive the bodies. Furthermore, since it is possible to selectively drive two or more bodies, the present invention is especially suited for application in an apparatus such as a tape recorder. When the present invention is applied to such an apparatus, it is possible to easily reduce the size, weight and manufacturing cost of the apparatus.

Still another object of the present invention is to provide a rotary driving mechanism further provided with a clutch mechanism, so that the third rotation transmitting body can selectively drive one of the first and second bodies via the clutch mechanism in the first position of the arm structure. According to the rotary driving mechanism of the present invention, the clutch mechanism effectively absorbs unevenness in the torque of the motor and vibrations caused by a belt, gears and the like. As a result, it is possible to rotationally drive the one of the first and second bodies with an extremely stable torque.

Other objects and further features of the present invention will be apparent from the following detailed description when read in conjunction with the accompanying drawings.

BRIEF DESCRIPTION OF THE DRAWINGS

FIG. 5 is a plan view showing an example of a third body which is to be driven in FIG. 1 together with the rotary driving mechanism;

FIG. 6 is a plan view showing another embodiment of the rotary driving mechanism according to the present invention; and FIG. 7 is a plan view showing the rotary driving mechanism shown in FIG. 6 in a rewind mode of an apparatus.

DETAILED DESCRIPTION

Figure 1:
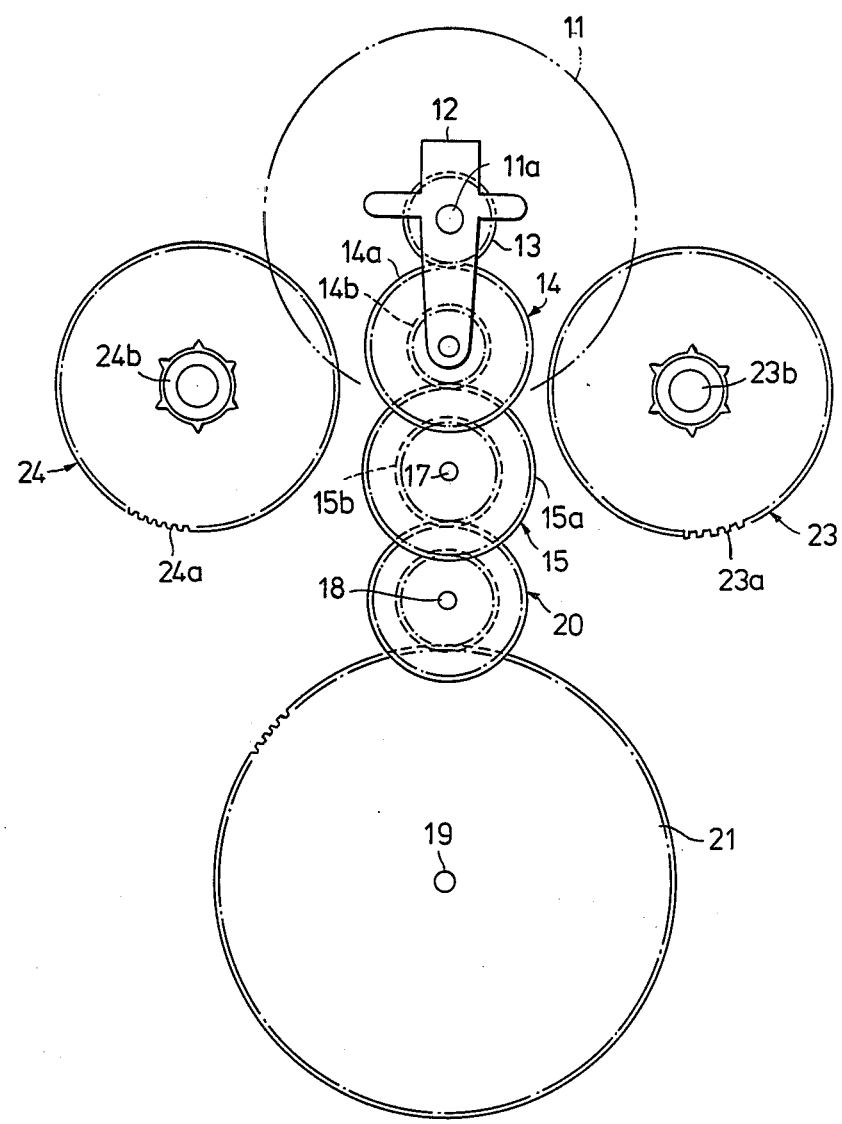
FIG. 1 is a plan view showing an embodiment of the rotary driving mechanism according to the present invention.
Figure 2:
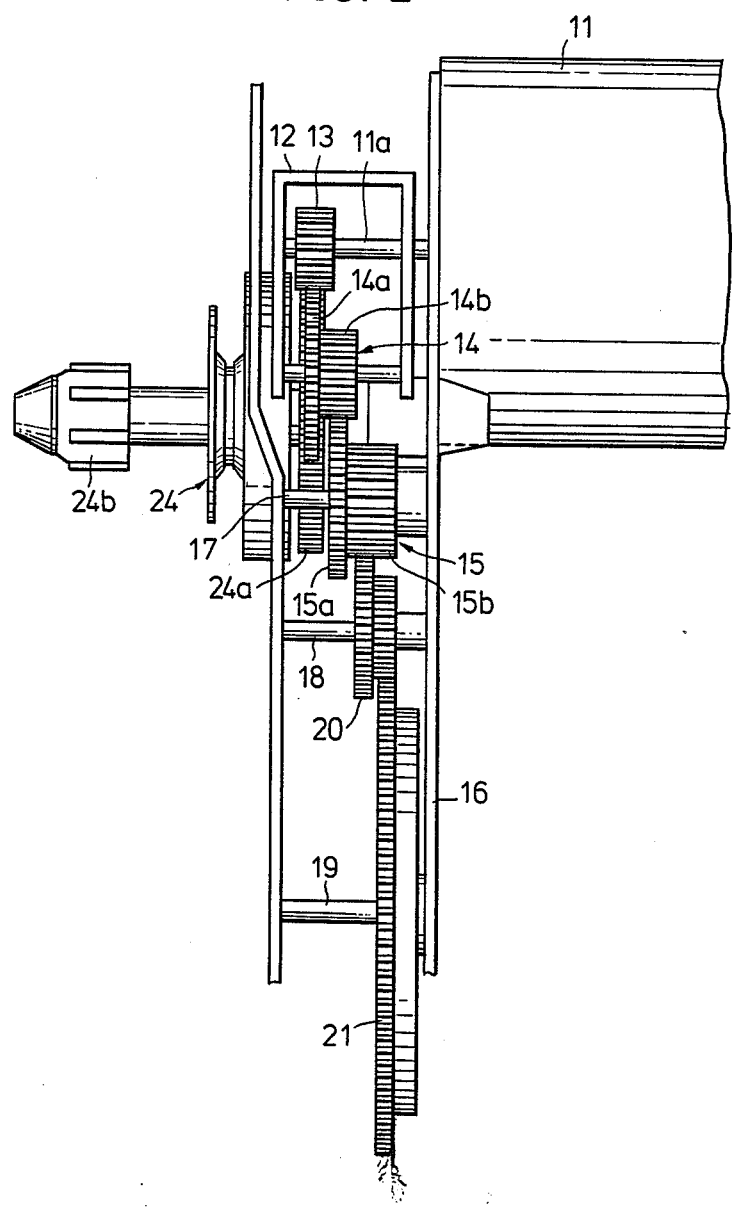
FIG. 2 is a side view from the right of the rotary driving mechanism shown in FIG. 1 with a take-up reel disc removed.

FIGS. 1 and 2 show an embodiment of the rotary driving mechanism according to the present invention. In the present embodiment, the rotary driving mechanism is applied to a tape recorder, however, the present invention can of course be applied to other apparatuses (for example, a video tape recorder).

In FIGS. 1 and 2, a motor 11 is rotatable in forward and reverse directions, and an arm structure 12 is pivotally supported on a rotary shaft 11a of the motor 11. The arm 12 comprises a pair of arm portions and has a substantially sideways-U cross section. A first gear 13 is fixed to the rotary shaft 11a of the motor 11, and the arm structure 12 is pivotally supported on the rotary shaft 11a so that the first gear 13 is positioned between the two arm portions of the arm structure 12. A second gear 14 is rotatably supported on a tip end of the arm structure 12. The second gear 14 unitarily comprises a large diameter gear portion (hereinafter simply referred to as a large gear portion) 14a and a small diameter gear portion (hereinafter simply referred to as a small gear portion) 14b. The large gear portion 14a is in mesh with the first gear 13. A third gear 15 unitarily comprises a large gear portion 15a and a small gear portion 15b, and is rotatably supported on a shaft 17 provided on a chassis 16. The large gear portion 15a of the third gear 15 is in mesh with the small gear portion 14b of the second gear 14. On the other hand, the small gear portion 15b of the third gear 15 is in mesh with a large gear portion of a gear 20 rotatably supported on a shaft 18 which is provided on the chassis 16, and a small gear portion of the gear 20 is in mesh with a gear 21 which is rotatably supported on a shaft 19 which is provided on the chassis 16.

A first body which is to be rotationally driven, that is, a take-up reel disc 23 of the tape recorder in the present embodiment, is provided with a gear 23a on a lower portion thereof. A second body which is to be rotationally driven, that is, a supply reel disc 24, is provided with a gear 24a on a lower portion thereof. The take-up and supply reel discs 24 and 23 are arranged with a predetermined separation. When a tape cassette (not shown) is loaded into the tape recorder, reel shafts 23b and 24b enter into and engage respective reel hubs of the tape cassette.

Figure 3:
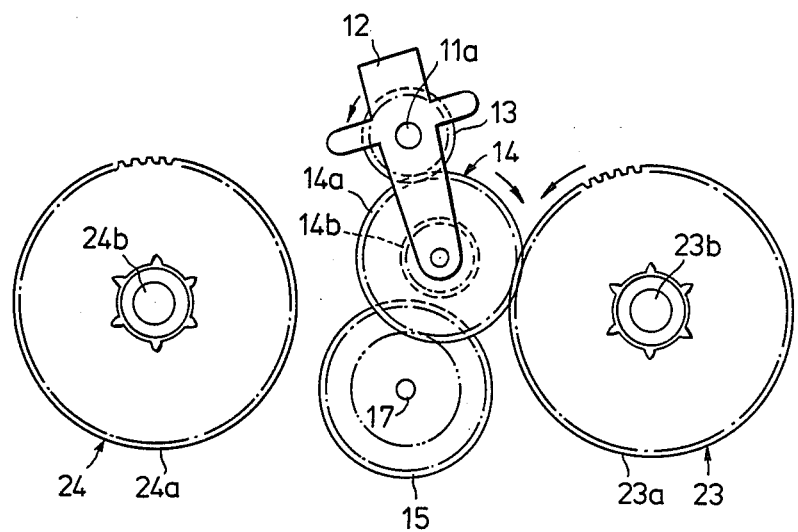
FIGS. 3 and 4 are plan views respectively showing an essential part of the rotary driving mechanism for explaining the operation thereof.

When the operating mode of the tape recorder is set to a fast-forward mode, a voltage having such a polarity that the motor 11 is rotated counterclockwise in FIG. 1 is applied to the motor 11. As a result, the first gear 13 rotates counterclockwise together with the rotary shaft 11a of the motor 11. In addition, the second gear 14 rotates clockwise because the large gear portion 14a is in mesh with the first gear 13. In this state, the small gear portion 14b of the second gear 14 is in mesh with the third gear 15. But since the third gear 15 has a predetermined rotary load due to loads of the gears 20 and 21 which operate another mechanism (not shown), the third gear 15 does not rotate. For example, the third gear 15 does not rotate because the gears 20 and 21 are locked so as not to rotate in a non-operating state of the other mechanism. For this reason, the small gear portion 14b of the second gear 14 rolls on the large gear portion 15a of the third gear 15 while in mesh therewith, and the arm structure 12 pivots to the right as shown in FIG. 3. When the arm structure 12 pivots to the right, the large gear portion 14a of the second gear 14 begins to mesh with the gear 23a of the take-up reel disc 23, and the small gear portion 14b of the second gear 14 begins to separate from the large gear portion 15a of the third gear 15 so as to disengage the mesh therewith. Accordingly, the take-up reel disc 23 is driven by the motor 11 via the first gear 13 and the large gear portion 14a of the second gear 14, and is rotated counterclockwise. Hence, it is possible to transport a magnetic tape accommodated within the tape cassette in the fast-forward mode.

In order to stop the fast-forward mode, the polarity of the voltage applied to the motor 11 is inverted for a short period of time. As a result, the motor 11 rotates the first gear 13 clockwise in FIG. 1. In addition, the small gear portion 14b of the second gear 14 meshes with the large gear portion 15a of the third gear 15 and rolls to the left in FIG. 3, and the large gear portion 14a of the second gear 14 separates from the gear 23a of the take-up reel disc 23. Thus, the voltage applied to the motor 11 should be cut off when the arm structure 12 returns to the central position shown in FIG. 1. It is possible to provide a spring (not shown) on the arm structure 12 so that the arm structure 12 is constantly urged to return to the central position shown in FIG. 1. In this case, when the voltage applied to the motor 11 is cut off in the fast-forward mode shown in FIG. 3, the arm structure 12 and the second gear 14 return to the respective positions shown in FIG. 1 by the action of the spring.

Figure 4:
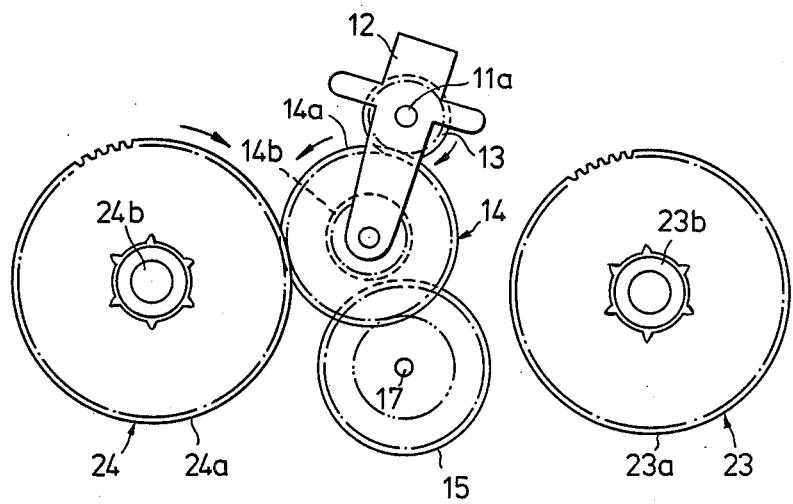

On the other hand, when the operating mode of the tape recorder is set to a rewind mode, the motor 11 is rotated in a direction opposite to that at the time of the fast-forward mode. As a result, the small gear portion 14b of the second gear 14 meshes with the large gear portion 15a of the third gear 15 and rolls to the left as shown in FIG. 4. As shown in FIG. 4, the large gear portion 14a of the second gear 14 meshes with the gear 24a of the supply reel disc 24, and the small gear portion 14b of the second gear 14 separates from the large gear portion 15a of the third gear 15. Hence, the supply reel disc 24 is driven by the motor 11 via the first gear 13 and the large gear portion 14a of the second gear and is rotated clockwise in FIG. 4. Thus, it is possible to transport the magnetic tape accommodated within the tape cassette in the rewind mode.

As may be understood from the description given before, the rewind mode can be stopped by carrying out operations in correspondence with the operations carried out for stopping the fast-forward mode. In other words, the polarity of the voltage applied to the motor 11 is inverted for a short period of time, and the voltage applied to the motor 11 is cut off when the arm structure 12 returns to the central position shown in FIG. 1.

According to the present embodiment, it is possible to positively and rotationally drive a pair of bodies which are to be driven by use of a simple mechanism employing a single motor which is rotatable in the forward and reverse directions. In addition, since the rotary drive mechanism has a simple construction, the size, weight and manufacturing cost of the rotary drive mechanism can be reduced. Furthermore, when the arm structure 12 is in the central position, it is possible to drive a third body which is to be driven via the gears 20 and 21. Especially when the present embodiment is applied to an apparatus such as the tape recorder, it is possible to easily reduce the size, weight and manufacturing cost of the apparatus.

Next, description will be given with respect to an example of the third body which is to be driven. FIG. 5 shows a head moving mechanism together with a part of the rotary drive mechanism. In FIG. 5, those parts which are the same as those corresponding parts in FIG. 1 are designated by the same reference numerals, and description thereof will be omitted.

When the arm structure 12 of the rotary drive mechanism is in the central position, the third gear 15 is rotated by the small gear portion 14b of the second gear 14, and the third gear 15 rotates a gear 21A via the gear 20. The head moving mechanism generally comprises the gear 21A, a pin 30 provided on a top surface of the gear 21A, and a plate 31 supported on the pin 30. A magnetic head 32 is provided on the plate 31. When the gear 21A rotates, the rotary position of the pin 30 changes to thereby move the plate 31 upwardly and downwardly in FIG. 5. As a result, the magnetic head 32 is moved upwardly and downwardly. For example, a non-toothed portion is formed on the outer periphery of the gear 21A for a predetermined angular range, so that the plate 31 is movable between predetermined raised and lowered positions.

According to the conventional rotary drive mechanism, it is possible to drive only a pair of bodies which are to be driven. Hence, in order to drive the head moving mechanism described above, it is necessary to provide a motor exclusively for driving the head moving mechanism. However, according to the present invention, it is unnecessary to provide a motor exclusively for driving the head moving mechanism because the head moving mechanism can be driven by the second gear 14. Hence, it is possible to effectively reduce the size and weight of the apparatus, and the manufacturing cost of the apparatus can be reduced since the construction of the rotary drive mechanism is simple.

Next, description will be given with respect to another embodiment of the rotary drive mechanism according to the present invention by referring to FIGS. 6 and 7. A pulley 40 unitarily comprises a first gear 41 and is rotated unitarily therewith by a motor (not shown) via a belt 42. An arm structure 44 is pivotally supported on a shaft 43 of the pulley 40 and the first gear 41. A second gear 45 is rotatably supported on a tip end of the arm structure 44. This second gear 45 unitarily comprises a small gear portion 45a a large gear portion 45b which is constantly in mesh with the first gear 41 As shown in FIG. 6, the small gear portion 45a is in mesh with a small gear portion of a third gear 46 having a predetermined rotary load in the central position of the arm structure 44. The shaft 43 and the third gear 46 are provided on a chassis (not shown).

A clutch mechanism comprises a clutch base 48, speed reduction gears 49 and 50 rotatably provided on the clutch base 48, and a clutch gear 51. A large gear portion of the third gear 46 is in mesh with the speed reduction gear 49, and the speed reduction gear 49 is in mesh with the speed reduction gear 50. The speed reduction gear 50 is in mesh with the clutch gear 51. As in the case of the second gear 45 described before, the gears 49 through 51 respectively comprise unitarily two gear portions having mutually different diameters. A pin 52 is provided on the clutch base 48, and this pin 52 fits into a circular cam groove 54 formed on a mode setting cam part 53. The center of the cam groove 54 is deviated from the center of the cam part 53. Accordingly, when the cam part 53 is rotated depending on the mode to which the apparatus is to be set, the pin 52 moves within the cam groove 54 and the clutch base 48 is accordingly moved upwardly and downwardly in FIG. 6.

When the apparatus is set to a play mode, for example, the cam part 53 is rotated to a rotary position shown in FIG. 6. In this state, the clutch base 48 is at a lowered position, and a depression 48a of the clutch base 48 engages the tip end of the arm structure 44. Hence, the arm structure 44 is locked at the central position. Thus, the second gear 45 is in mesh with the third gear 46, and the rotation of the second gear 45 is transmitted sequentially to the third gear 46, the speed reduction gears 49 and 50, and the clutch gear 51. Since the clutch gear 51 is in mesh with a take-up reel disc 61 at the lowered position of the clutch base 48, the take-up reel disc 61 is rotated by the clutch gear 51.

According to the present embodiment, the unevenness of the torque of the motor and the vibrations caused by the belt 42, gears and the like are effectively absorbed by the clutch mechanism. Hence, it is possible to rotationally drive the take-up reel disc 61 with a stable torque in the play mode (or recording mode).

On the other hand, the cam part 53 is rotated to a rotary position shown in FIG. 7 when the mode of the apparatus is to be set to the rewind mode, for example. As shown in FIG. 7, the pin 52 is guided by the cam groove 54 and the clutch base 48 is in a raised position. In this state, the depression 48a of the clutch base 48 no longer engages the tip end of the arm structure 44, and the locking of the arm structure 44 to the central position is cancelled. As a result, the arm structure 44 rotates clockwise or counterclockwise from the central position depending on the rotating direction of the pulley 40. Furthermore, the speed reduction gear 49 disengages from the third gear 46, and the clutch gear 51 disengages from the take-up reel disc 61. Accordingly, when the pulley 40 rotates in the direction of the arrow, the arm structure 44 pivots to the left (counterclockwise) in FIG. 7 and the large gear portion 45b of the second gear 45 meshes with a supply reel disc 62 to rotationally drive the supply reel disc 62.

In the case of the fast-forward mode, the arm structure 44 pivots to the right (clockwise) in FIG. 6, and the take-up reel disc 61 is rotationally driven by the large gear portion 45b of the second gear 45.

Further, the present invention is not limited to the embodiments, but various variations and modifications may be made without departing from the scope of the present invention.

What is claimed is:

1. A rotary drive mechanism for selectively and rotationally driving at least first and second bodies which are to be driven, said rotary drive mechanism comprising:

a single motor rotatable in forward and reverse directions;

an arm structure pivotally supported on an output shaft rotated by said motor, said arm structure having first, second and third rotary positions;

a first rotation transmitting body fixed to said output shaft;

a second rotation transmitting body rotatably supported on said arm structure, said second rotation transmitting body comprising a first transmitting part which is constantly linked to said first rotation transmitting body and a second transmitting part; and a third rotation transmitting body having a predetermined rotary load, said third rotation transmitting body being linked to said second transmitting part when said arm structure is in said first rotary position whereby the predetermined load is sufficient to allow the second transmitting part to roll thereon when driven by the first rotation transmitting body, said second transmitting part disengaging from said loaded third rotation transmitting body when said motor rotates in the forward direction, and said first transmitting part engaging and rotationally driving said first body when said arm structure rotates from said first rotary position to said second rotary position, said second transmitting part disengaging from said loaded third rotation transmitting body when said motor rotates in the reverse direction, and said first transmitting part engaging and rotationally driving said second body when said arm structure rotates from said first rotary position to said third rotary position.

2. A rotary drive mechanism as claimed in claim 1 in which said first and second bodies comprise reel discs for rotating reel driving shafts, said reel driving shafts driving reels of a tape cassette.

3. A rotary drive mechanism as claimed in claim 1 in which said output shaft comprises a rotary shaft of said motor.

4. A rotary drive mechanism as claimed in claim 1 in which said output shaft comprises a shaft driven by said motor via a belt-shaped member.

5. A rotary drive mechanism as claimed in claim 1 in which said first through third rotation transmitting bodies comprise gears.

6. A rotary drive mechanism as claimed in claim 5 in which said first transmitting part comprises a large diameter gear portion and said second transmitting part comprises a small diameter gear portion having a diameter smaller than a diameter of said large diameter gear portion.

7. A rotary drive mechanism as claimed in claim 5 in which said first transmitting part comprises a small diameter gear portion and said second transmitting part comprises a large diameter gear portion having a diameter larger than a diameter of said small diameter gear portion.

8. A rotary drive mechanism as claimed in claim 1 in which said third rotation transmitting body is linked to a third body which is to be driven, said third rotation transmitting body rotationally driving said third body when said arm structure is in said first rotary position.

9. A rotary drive mechanism as claimed in claim 8 in which said third body constitutes a head moving mechanism for moving a head.

10. A rotary drive mechanism as claimed in claim 1 which further comprises a clutch mechanism, said third rotation transmitting body rotationally driving one of said first and second bodies via said clutch mechanism when said arm structure is in said first position.

* * * * *